US010383029B2

(12) United States Patent
Yan

(10) Patent No.: US 10,383,029 B2
(45) Date of Patent: Aug. 13, 2019

(54) INFORMATION PROCESSING METHOD AND BASE STATION

(71) Applicant: Lenovo (Beijing) Co. LTD., Beijing (CN)

(72) Inventor: Zhi Yan, Beijing (CN)

(73) Assignee: Lenovo (Beijing) Co. LTD, Beijing (CN)

( * ) Notice: Subject to any disclaimer, the term of this patent is extended or adjusted under 35 U.S.C. 154(b) by 0 days.

(21) Appl. No.: 15/525,267

(22) PCT Filed: Mar. 27, 2015

(86) PCT No.: PCT/CN2015/075270
§ 371 (c)(1),
(2) Date: May 8, 2017

(87) PCT Pub. No.: WO2016/070554
PCT Pub. Date: May 12, 2016

(65) Prior Publication Data
US 2018/0184358 A1    Jun. 28, 2018

(30) Foreign Application Priority Data

Nov. 7, 2014 (EP) .............................. 201410638694

(51) Int. Cl.
*H04W 40/22* (2009.01)
*H04B 7/15* (2006.01)
(Continued)

(52) U.S. Cl.
CPC .............. *H04W 40/22* (2013.01); *H04B 7/15* (2013.01); *H04W 76/14* (2018.02); *H04W 88/04* (2013.01); *H04B 17/336* (2015.01)

(58) Field of Classification Search
CPC ..... H04W 40/22; H04W 76/14; H04W 88/04; H04B 7/15; H04B 17/336
(Continued)

(56) References Cited

U.S. PATENT DOCUMENTS 6,473,617 B1 * 10/2002 Larsen ................. H04B 7/2606
455/446
2006/0209758 A1 * 9/2006 Qiang ............... H04W 36/0083
370/331
(Continued)

FOREIGN PATENT DOCUMENTS

CN    103607750 A    2/2014
CN    104105158 A    10/2014
(Continued)

OTHER PUBLICATIONS

3rd Generation Partnership Project; Technical Specification Group Services and System Aspects; Sudty on architecture enhancements to support Proximity-based Services (ProSe) (Release 12), 3GPP Standard; Technical Report vol. SA WG2, No. V12.0.0, Mar. 10, 2014, pp. 1-324.
(Continued)

*Primary Examiner* — Chi Tang P Cheng
(74) *Attorney, Agent, or Firm* — Kunzler Bean & Adamson

(57) ABSTRACT

The present disclosure discloses an information processing method and a base station. The method comprises: determining N first regions based on N first thresholds; determining T third regions based on the N first regions and M second regions, the M second regions being determined based on M second thresholds, the second threshold representing reliability of a second communication connection, the second communication connection being a communication connection between a destination user terminal and a user terminal other than the destination user terminal within
(Continued)

the cell of the base station; selecting a relay user terminal from among user terminals within the third regions, to establish a relay communication connection with the destination user terminal through the relay user terminal. Accordingly, computation cost and channel bandwidth for selecting the relay user terminal are saved, processing delay is small, and the communication connection with the destination user terminal can be established rapidly.

16 Claims, 6 Drawing Sheets

(51) Int. Cl.
*H04W 88/04* (2009.01)
*H04W 76/14* (2018.01)
*H04B 17/336* (2015.01)

(58) Field of Classification Search
USPC .......................................................... 370/315
See application file for complete search history.

(56) References Cited

U.S. PATENT DOCUMENTS

| 2008/0070610 | A1* | 3/2008 | Nishio ................ H04W 52/281 |
| | | | 455/509 |
| 2012/0250545 | A1 | 10/2012 | Papadogiannis et al. |
| 2013/0188552 | A1 | 7/2013 | Kazmi et al. |

FOREIGN PATENT DOCUMENTS

| WO | 2013/131234 A1 | 9/2013 |
| WO | 2014/179294 A2 | 11/2014 |

OTHER PUBLICATIONS

Institute for Information Industry (III), "UE-Relay for Device to Device Proximity Services", 3GPP TSG-RAN WG1 Meeting #74, R1-133188, Aug. 19-23, 2013, pp. 1-2.
PCT/CN2015/075270, Notification of Transmittal of the International Search Report and the Written Opinion of hte International Searching Authority, or the Declaration, dated Aug. 17, 2015.

* cited by examiner

INFORMATION PROCESSING METHOD AND BASE STATION

TECHNICAL FIELD

The present disclosure relates to a telecommunication technology, and more particularly, to an information processing method and a base station.

BACKGROUND

A relay selection is introduced into a network which hybrids a cellular communication and a Device To Device (D2D) communication controlled by a cellular, and an idle user terminal serves as a relay for assisting in completion of the cellular communication between a base station and a destination user terminal, so as to enhance a diversity effect of the user terminal, improve data transfer rate, and improve data transfer stability; and user terminal relay communication is also a key research point on the D2D in future 5G communication.

In order to pursue global optimum, all the idle user terminals are often traversed in related technologies, to calculate corresponding selection criteria, and finally select the optimal relay user terminal, but a large computation cost results in great time delay of the system, so that the communication between the base station and the destination user terminal cannot be quickly established;

And in the related technologies, corresponding selection policy criteria is usually calculated based on user's instantaneous channel state information. Since the Channel State information (CSI) requires a large amount of feedback information, if state information of all the idle users is fed back to the base station, much channel bandwidth will be occupied, which results in a waste of resources;

In summary, there is still no effective solution in the related technologies for reducing resource consumption in establishing the relay communication, or improving efficiency of establishing a relay communication connection.

SUMMARY OF THE INVENTION

Embodiments of the present disclosure provide an information processing method and a base station, which can reduce resource consumption for establishing a relay communication connection, and improve efficiency of establishing the relay communication connection.

Technical solutions of the embodiments of the present disclosure are implemented as below.

An embodiment of the present disclosure provides an information processing method applied to a base station. The method comprises: determining N first regions based on N first thresholds, the first threshold representing reliability of a first communication connection, the first communication connection being a communication connection between the base station and a user terminal within a cell of the base station, N being an integer greater than or equal to 1; determining T third regions based on the N first regions and M second regions, M and T being integers greater than or equal to 1, the M second regions being determined based on M second thresholds, the second threshold representing reliability of a second communication connection, the second communication connection being a communication connection between a destination user terminal and a user terminal other than the destination user terminal within the cell of the base station; selecting a relay user terminal from among user terminals within the third regions, to establish a relay communication connection with the destination user terminal through the relay user terminal.

Preferably, the determining N first regions based on N first thresholds comprises: determining receiving signal-to-noise ratio thresholds corresponding to the N first thresholds, based on the reliability of the first communication connection; determining N first distances based on the N receiving signal-to-noise ratio thresholds, wherein the first distance is a distance between the base station and the user terminal within the cell of the base station; determining the N first regions among the cell of the base station reference to the position of the base station, based on the N first distances determined.

Preferably, the method further comprises: determining M receiving signal-to-noise ratio thresholds corresponding to the M second thresholds, based on the reliability of the second communication connection; determining M second distances corresponding to the M receiving signal-to-noise ratio thresholds based on the M receiving signal-to-noise ratio thresholds; determining the M second regions reference to the position of the destination user terminal based on the M second distances determined.

Preferably, the determining T third regions based on the N first regions and M second regions comprises: identifying an overlapping region between any first region and any second region as the third region; identifying priority of the third region based on the first threshold and the second threshold corresponding to the third region.

Preferably, the selecting a relay user terminal among user terminals within the third regions comprises: selecting a target third region in a descending order of priority of the T third regions; selecting a user terminal whose link capacity meets a preset condition from among user terminals within the target third region selected, as the relay user terminal.

An embodiment of the present disclosure further provides a base station. The base station comprises a first determining unit, a second determining unit, and a connecting unit.

The first determining unit determines N first regions based on N first thresholds. The first threshold represents reliability of a first communication connection. The first communication connection is a communication connection between the base station and a user terminal within a cell of the base station. N is an integer greater than or equal to 1;

The second determining unit determines T third regions based on the N first regions and M second regions. M and T are integers greater than or equal to 1. The M second regions are determined based on M second thresholds. The second threshold represents reliability of a second communication connection. The second communication connection is a communication connection between a destination user terminal and a user terminal other than the destination user terminal within the cell of the base station;

The connecting unit selects a relay user terminal from among user terminals within the third regions, to establish a relay communication connection with the destination user terminal through the relay user terminal.

Preferably, the first determining unit comprises a first determining module, a second determining module, a third determining module.

The first determining module determines N receiving signal-to-noise ratio thresholds corresponding to the N first thresholds based on the reliability of the first communication connection.

The second determining module determines N first distances based on the N receiving signal-to-noise ratio thresholds. The first distance is a distance between the base station and the user terminal within the cell of the base station.

The third determining module determines the N first regions within the cell of the base station reference to the position of the base station, based on the N first distances determined.

Preferably, the base station further comprises a third determining unit, a fourth determining unit, a fifth determining unit.

The third determining unit determines M receiving signal-to-noise ratio thresholds corresponding to the M second thresholds, based on the reliability of the second communication connection;

The fourth determining unit determines M second distances corresponding to the M receiving signal-to-noise ratio thresholds based on the M receiving signal-to-noise ratio thresholds;

The fifth determining unit determines the M second regions reference to the a position of the user terminal based on the M second distances determined.

Preferably, the second determining unit comprises a fourth determining module, a fifth determining module.

The fourth determining module identifies an overlapping region between any first region and any second region as the third region.

The fifth determining module identifies priority of the third region based on the first threshold and the second threshold corresponding to the third region.

Preferably, the connecting unit comprises a first selecting module and a second selecting module.

The first selecting module selects a target third region in a descending order of priority of the T third regions.

The second selecting module selects a user terminal whose link capacity meets a preset condition from among user terminals within the destination third region selected, as the relay user terminal.

In the embodiments of the present disclosure, the relay user terminal is selected from among the user terminals within the third region. Since the third region is obtained based on the first region and the second region, it belongs to a partial region in the cell of the base station, which avoids large computation cost and great time delay in the related technologies resulting from selection of the optimal relay user terminal by traversing all the user terminals in the cell. Moreover, the first region and the second region are obtained based on the reliability of the communication connection, so that the relay user terminal can be selected without obtaining the instantaneous channel state information of all the idle user terminals, which avoids occupation of much channel bandwidth and a waste of channel resources when the state information of all the user terminals need to be feedback to the base station. Meanwhile, since the selected regions (the first region and the second region) are determined based on the reliability of the communication connection, it is of the highest probability that the relay user terminal selected in the third region is the optimal relay user terminal selected in a global mode, which ensures the reliability of the relay communication connection.

DESCRIPTION OF THE EMBODIMENTS

Figure 1:
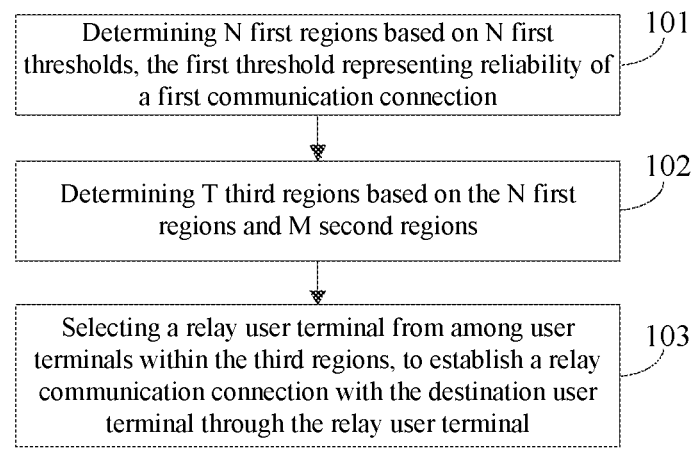
FIG. 1 is an implementation flow schematic diagram I of an information processing method according to an embodiment of the present disclosure.

In an embodiment of the present disclosure, as shown in FIG. 1, in step 101, N first regions are determined based on N first thresholds. The first threshold represents reliability of a first communication connection. The first communication connection is a communication connection between the base station and a user terminal within a cell of the base station. N is an integer greater than or equal to 1. In step 102, T third regions are determined based on the N first regions and M second regions. M and T are integers greater than or equal to 1. The M second regions are determined based on M second thresholds. The second threshold represents reliability of a second communication connection. The second communication connection is a communication connection between a destination user terminal and a user terminal other than the destination user terminal within the cell of the base station. In step 103, a relay user terminal is selected from among user terminals within the third region, and a relay communication connection is established with the destination user terminal through the relay user terminal.

In the embodiment of the present disclosure, the first region and the second region are determined based on the reliability of the communication connection, and the user terminal is selected from among the third region determined based on the first region and the second region, and is used as the relay user terminal through which the communication connection is established between the destination user terminal and the base station, without traversing all the idle user terminals in the cell, and without feeding back all the state information of the idle users to the base station. Therefore, as compared with the related technologies, computation cost and channel bandwidth are saved, a processing delay is small, and the relay communication connection with the destination user terminal can be rapidly established.

Hereinafter, the present disclosure is further illustrated in detail in conjunction with the accompanying drawings and the specific embodiments.

Embodiment One

This embodiment discloses an information processing method applied to a base station, which can enable the base station to search a relay user terminal in a cell highly efficiently so as to establish a relay communication connection with a destination user terminal, reduce complexity and time delay of the search, and save computation cost and channel bandwidth.

Figure 2:
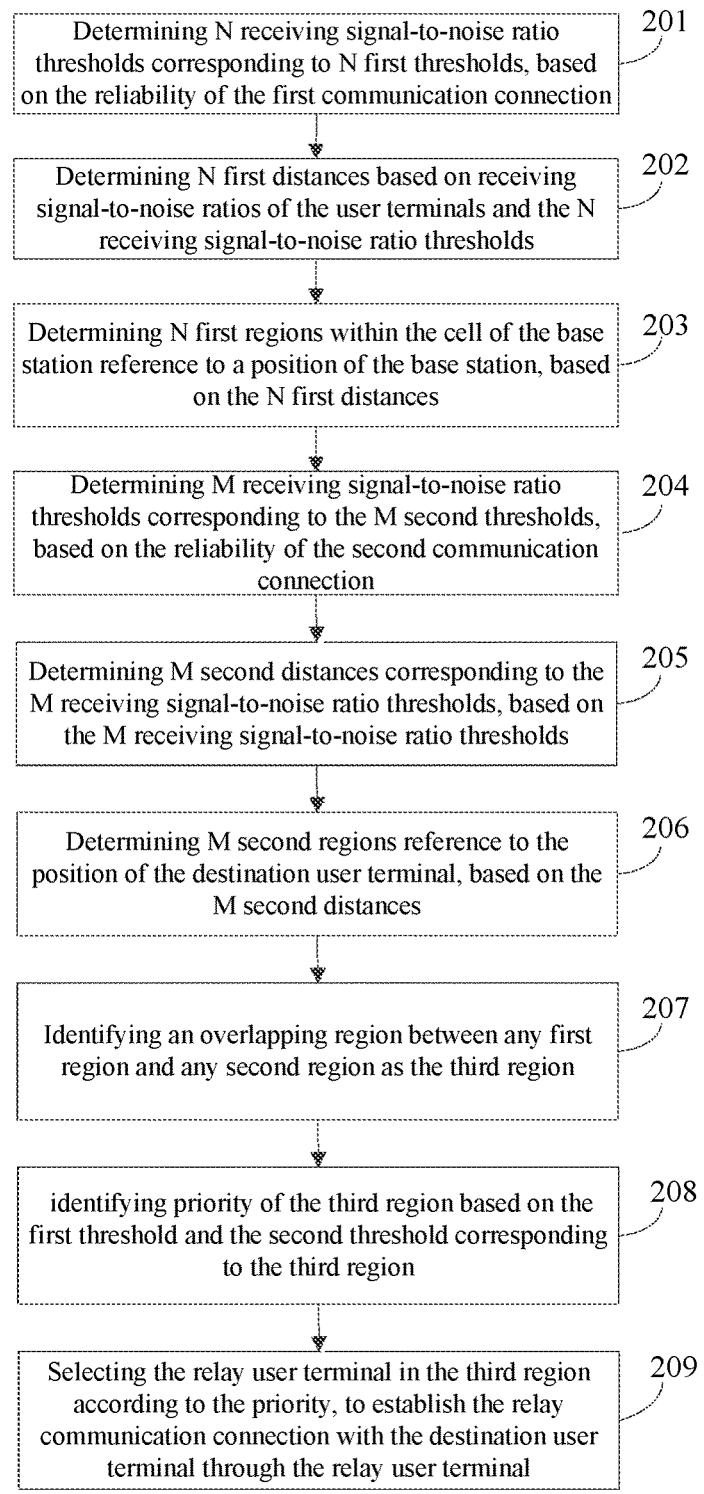
FIG. 2 is an implementation flow schematic diagram II of an information processing method according to an embodiment of the present disclosure.

As shown in FIG. 2, the information processing method disclosed in this embodiment includes steps of 201 to 209.

Step 201: determining N receiving signal-to-noise ratio thresholds corresponding to the N first thresholds, based on reliability of a first communication connection;

The first threshold represents reliability of the first communication connection, and the first communication connection is a communication connection between the base station and a user terminal within the cell of the base station. N is an integer greater than or equal to 1.

Step 202: determining N first distances based on receiving signal-to-noise ratios of the user terminals and the N receiving signal-to-noise ratio thresholds.

The first distance is a distance between the base station and the user terminal within the cell of the base station.

Step 203: determining N first regions within the cell of the base station reference to the position of the base station based on the N first distances.

Step 204: determining M receiving signal-to-noise ratio thresholds corresponding to M second thresholds, based on the reliability of a second communication connection.

The second threshold represents reliability of the second communication connection, and the second communication connection is a communication connection between a destination user terminal and a user terminal other than the destination user terminal within the cell of the base station.

Step 205: determining M second distances corresponding to the M receiving signal-to-noise ratio thresholds, based on the M receiving signal-to-noise ratio thresholds.

Step 206: determining M second regions reference to the position of the destination user terminal, based on the M second distances.

It should be noted that both the determining the first regions in step 201 to step 203 and the determining the second regions in step 204 to step 206 are preformed when the base station determines to communicate with the destination user terminal in a relay communication mode, which are executed in no specific order.

Step 207: identifying an overlapping region between any first region and any second region as the third region.

Step 208: identifying priority of the third region, based on the first threshold and the second threshold corresponding to the third region.

For the first communication connection, the larger the distance between the base station and the user terminal is, the smaller the reliability of the communication connection is achieved. Typically, the first threshold corresponds to an outage probability of the first communication connection. The smaller the reliability of the first communication connection is, the larger the first threshold is, and the larger the corresponding first region determined is, i.e., the larger the region (corresponding to the first region) that can be searched for the user terminal so as to at least meet the communication reliability corresponding to the first threshold is.

For the second communication connection, the larger the distance between a candidate relay user terminal and the destination user terminal in the cell is, the smaller the reliability of the communication connection achieved is. Typically, the second threshold corresponds to an outage probability of the second communication connection. The smaller the reliability of the second communication connection is, the larger the second threshold is, and the larger the corresponding second region determined is, i.e., the larger the region (corresponding to the second region) that can be searched for the user terminal so as to at least meet the communication reliability corresponding to the second threshold. Based on the above analysis, a set of the third regions obtained in step 207 may be prioritized by using a method of combining the first threshold and the second threshold. The smaller the first threshold and the second threshold corresponding to the third region are, the higher the priority of the third region is, which represents a higher reliability for searching the user terminal within the third region as the relay user terminal to establish the relay connection with the destination user terminal. In practical application, the user terminal within the third region may be searched in a descending order of priority as the relay user terminal, to establish the relay communication connection with the destination user terminal. The third regions are prioritized and the user terminal is searched in an order of priority, and thus the computation cost is low and the time delay is small. Moreover, the relay user terminal can be selected without obtaining the instantaneous channel state information of all the user terminals, less channel bandwidth are occupied and the channel resources are saved. Meanwhile, since the selected regions (the first region and the second region) are determined based on the reliability of the communication connection, it is of the highest probability that the relay user terminal selected in the third region is the optimal relay user terminal selected in a global mode, which ensures the reliability of the relay communication connection.

Step 209: selecting the relay user terminal in the third region according to the priority, to establish the relay communication connection with the destination user terminal through the relay user terminal.

The user terminal with a maximum link communication capacity is selected in the third region of the highest priority. If the third region of the highest priority is null, then the user terminal of the maximum link capacity (i.e., the idle user terminal with the maximum link capacity) may be selected in the third region of the second highest priority as the relay user terminal. The communication connection may be established by steps of: allocating frequency and time slot to the destination user terminal and the relay user terminal, notifying the destination user terminal and the corresponding relay user terminal of an allocation result through a downlink control channel; the base station communicating with the relay user terminal by using the frequency and time slot allocated, and the relay user terminal communicating with the destination user terminal by using the frequency and time slot allocated, so as to implement the relay communication between the base station and the destination user terminal.

Embodiment Two

Figure 3:
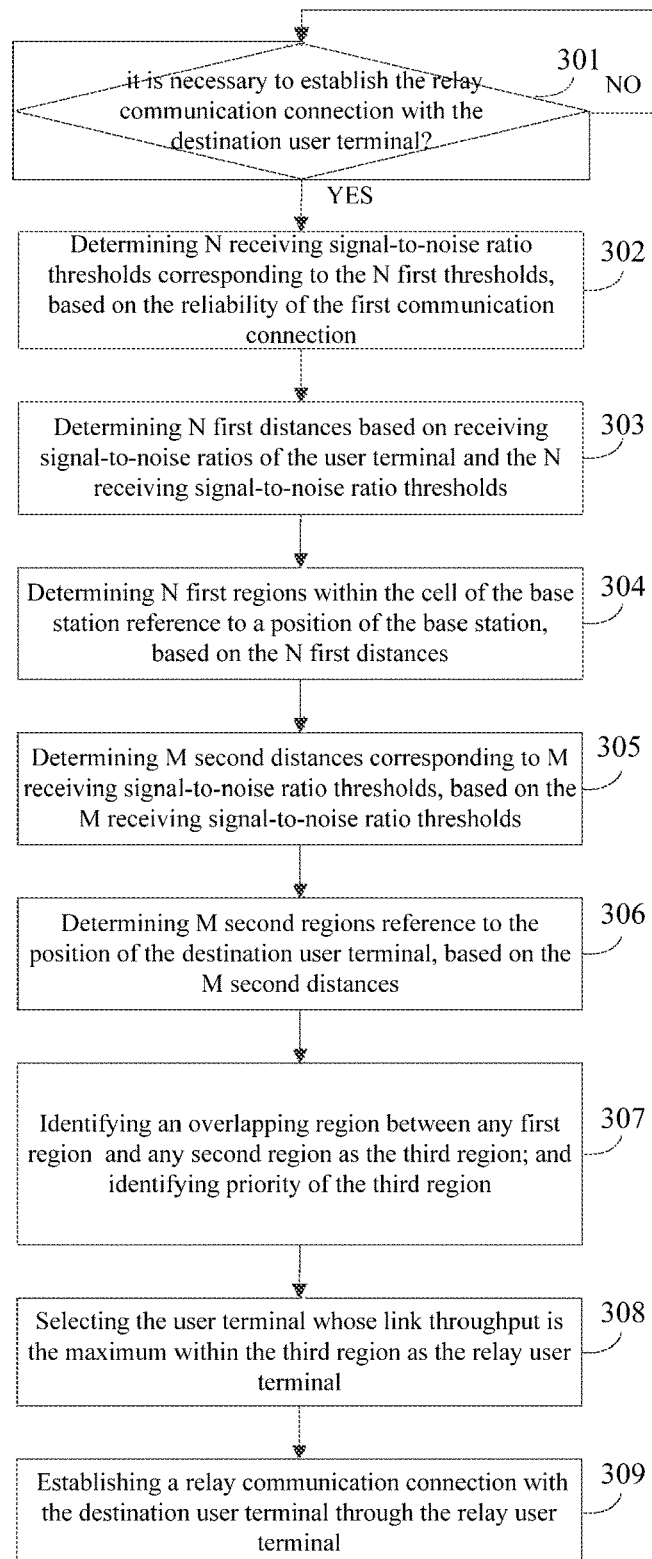
FIG. 3 is an implementation flow schematic diagram III of an information processing method according to an embodiment of the present disclosure.

This embodiment discloses an information processing method, for establishing a relay communication connection between a base station and a destination user terminal, as shown in FIG. 3, which may be implemented by steps of 301 to 309.

Step 301: determining, by the base station, whether it is necessary to establish the relay communication connection with the destination user terminal or not, according to quality of a link to the destination user terminal; if so, executing step 302; otherwise, returning to step 301.

In practical application, step 301 may be performed periodically to ensure the quality of the link between the base station and the destination user terminal, and ensure a communications effect. When the quality of the link between the base station of a cellular system and the destination user terminal decreases, the base station may start a relay communication mode with the destination user terminal. The process of the base station starting the relay mode is illustrated as follows: when the base station communicates with the destination user terminal according to a maximum transmitting power, if an index of the quality of the communication link between the base station and the destination user terminal decreases (e.g., the index decreases by a value only above a preset value, or the index decreases below a preset value), there is no resource in an adjacent cell (a cell adjacent to the cell of the base station) that can be allocated to the destination user terminal for cell switching, or the index of the communication link quality of the adjacent cell is below a preset threshold, the base station may start the relay communication mode; it is assumed that a base station A communicates normally with a user terminal a, the user terminal a will transmit a measurement report and a measurement report of the adjacent cell to the base station A in real time, and when a condition shown in Equation (1) is met, the relay communication mode with the destination user terminal may be started:

$$RSRP_A < \gamma \ \& \ RSRP_A > \forall RSRP_i \quad (1)$$

Where $RSRP_A$ is a Reference Signal Receiving Power, $\gamma$ is a preset threshold, a value of $\gamma$ may be set according to a specific application scenario, $i \in$ a set of adjacent cells.

In order to avoid large computation cost and great processing time delay resulting from searching all the idle user terminals in the cell, the cell may be divided into multi-level search regions (corresponding to a plurality of third regions). Since position information of each user terminal can be obtained at the base station side (by using a base station positioning technology), the multi-level search regions may be determined based on the position information of the base station and the destination user terminal, the user terminal is searched from the determined search region and used as the relay user terminal, and subsequent steps is illustrated by searching the idle user terminal as the relay user terminal.

Step 302: determining receiving signal-to-noise ratio thresholds corresponding to the N first thresholds, based on the reliability of the first communication connection.

The receiving signal-to-noise ratio $\Gamma$ of the idle user terminal in the region covered by the cell is associated with factors of: 1) a transmitting power of the base station; 2) a distance between a idle user terminal and the base station, which can be referenced to Equation (2):

$$\Gamma = \frac{c_0 |h|^2 P_0 d_1^{-\alpha}}{N_0} \quad (2)$$

Where, h is fast fading channel gain, $P_0$ is the transmitting power of the base station, $d_1$ is the distance between the idle user terminal and the base station, $\alpha$ is a space transmission path loss factor, $c_0$ is a path loss constant factor, $N_0$ is a sum of Gaussian white noise power and interference power. Equation (3) represents relationship between $\Gamma_0$ and an outage probability $\beta$ (corresponding to the first threshold) of the first communication connection (the communication connection between the base station and the user terminal);

$$P\{\Gamma > \Gamma_0\} = \beta \quad (3)$$

Where $\Gamma_0$ is a critical receiving signal-to-noise ratio; in a sense of statistics, $|h|^2 = 1$; when N different $\beta$ values are set, N different $\Gamma_0$ values (corresponding to the receiving signal-to-noise ratio thresholds) can be inferred inversely according to Equation (3).

Step 303: determining N first distances based on receiving signal-to-noise ratios of the user terminal and the N receiving signal-to-noise ratio thresholds.

Step 304: determining N first regions within the cell of the base station reference to the position of the base station, based on the N first distances.

In step 303 and step 304, N $d_1$ (corresponding to the first distances) are determined by Equation (2), so as to determine N concentric circle regions (corresponding to the first regions) with the base station as the center, which are expressed as $\Omega_0, \Omega_1, \Omega_2 \ldots \Omega_N$. The concentric circle regions correspond to different $\beta$ values (positively correlated), i.e., the smaller the outage probability is, the smaller the range of the first region is.

Step 305: determining M second distances corresponding to M receiving signal-to-noise ratio thresholds based on the M receiving signal-to-noise ratio thresholds.

Step 306: determining M second regions reference to the position of the destination user terminal, based on the M second distances.

Step 302 to step 305 are executed in a case that it is determined as YES in step 301, which are executed in no specific order, and step 305 and step 306 will be illustrated as below.

The concentric circle regions (corresponding to the second regions), corresponding to different receiving signal-to-noise ratio thresholds are divided with the destination user terminal being the center, according to the receiving signal-to-noise ratio thresholds (corresponding to the second thresholds) of M destination user terminals, which are expressed as $\Psi_0, \Psi_1 \ldots \Psi_M$, (where $P_0$ is set as maximum transmitting power allowed by relay user).

The receiving signal-to-noise ratio of the destination user terminal $\Gamma$ is expressed as the Equation (4) below:

$$\Gamma = \frac{c_0 |h|^2 P_0 d_2^{-\alpha}}{N_0} \quad (4)$$

in Equation (4), h is the fast fading channel gain, $P_0$ is a maximum transmitting power allowed by relay user, $d_2$ is a distance between the idle user terminal and the destination user terminal, $\alpha$ is a space transmission path loss factor, $c_0$ is a path loss constant factor, $N_0$ is a sum of a Gaussian white noise power and an interference power. A statistical significance of $\Gamma_0$ in accordance with the outage probability $\beta$ of the second communication connection (the communication connection between the destination user terminal and the relay user terminal) is shown in Equation (5):

$$P\{\Gamma > \Gamma_0\} = \beta \quad (5)$$

Where, $\Gamma$ is the receiving signal-to-noise ratio of the destination user terminal; the receiving signal-to-noise ratio thresholds $\Gamma_0$ of M different destination user terminals can be determined by setting M (an integer greater than 1) different $\beta$ values (corresponding to the second threshold). M different $d_2$ i.e., the distance between the destination user terminal and the relay user terminal (corresponding to the second distance) can be inferred inversely according to Equation (4), so as to determine M concentric circle regions (corresponding to the second region) with the destination user terminal being the center, which are denoted as $\Psi_0, \Psi_1 \ldots \Psi_M$.

Step 307: identifying an overlapping region between any first region and any second region as the third region; and identifying priority of the third region based on the first threshold and the second threshold corresponding to the third region.

The overlapping region of the above-described regions determined by the base station and the above-described regions determined by the destination user is shown in Equation (6):

$$\Delta_i = \bigcup_{j,k} (\Omega_j \cap \Psi_k) \ j+k=i, \ j<i, \ k<i \quad (6)$$

According to Equation (6), different third regions may be expressed as:

$$\Delta_0=\Omega_0\cap\Psi_0 \ \Delta_1=(\Omega_1\cap\Psi_0)\cup(\Omega_0\cap\Psi_1) \ \Delta_2=(\Omega_1\cap\Psi_1)\cup(\Omega_0\cap\Psi_2)\cup(\Omega_2\cap\Psi_0)$$

Figure 4:
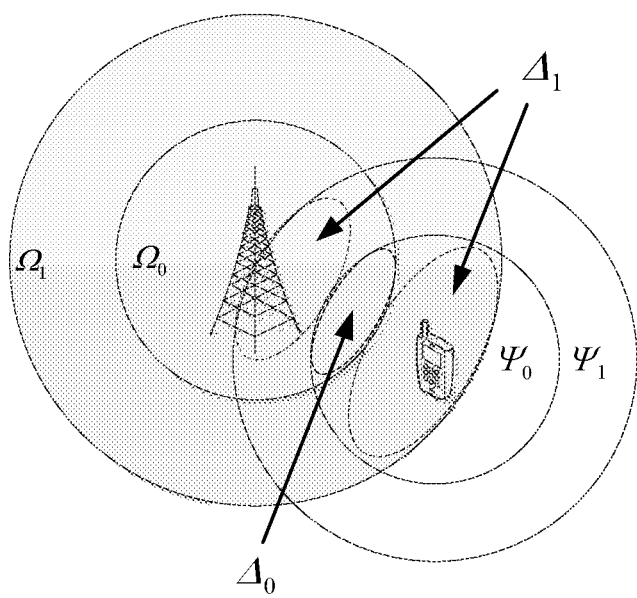
FIG. 4 is a schematic diagram of determining a third region according to an embodiment of the present disclosure.

In combination with Equation (6), an example of the third region is shown in FIG. 4, so as to determine the priority of the regions used for selecting the relay user terminal as $\{\Delta_0, \Delta_1, \Delta_2, \ldots\}$.

Step 308: selecting a user terminal whose link throughput is maximum within the third region as the relay user terminal.

The relay user terminal is selected in the third regions $\{\Delta_0, \Delta_1, \Delta_2, \ldots\}$ sequentially, which may be selected in each third region by using a sub-optimization strategy, until the relay user terminal meeting requirements is determined.

When the relay user terminal is determined, firstly, the user terminal of the maximum throughput in the entire link (including a relay link and a cellular link, corresponding to the first communication connection and the second communication connection) is used as the relay user terminal, according to the priority, in the idle user terminal in the third region of the highest priority, on the premise that quality standards of the relay link and the cellular link are met.

By taking the user terminal selected in the third region $\Delta_i$ as the relay user terminal as an example, if an idle user terminal k is accessed as the relay user terminal, then the receiving signal-to-noise ratio of the relay user terminal is shown in Equation (7):

$$\Gamma_{k,A} = \frac{c_0|h_{k,A}|^2 P_{k,0} d_{k,A}^{-\alpha}}{N_{k,0}} \quad (7)$$

The capacity (i.e. the throughput) of the cellular link is shown in Equation (8):

$$C_{k,A}=B \log(1+\Gamma_{k,A}) \quad (8)$$

The receiving signal-to-noise ratio of the destination user terminal is shown in Equation (9):

$$\Gamma_{k,a} = \frac{c_0|h_{k,a}|^2 P_{k,0} d_{k,a}^{-\alpha}}{N_{k,0}} \quad (9)$$

The capacity of the relay link is shown in Equation (10):

$$C_{k,a}=B \log(1+\Gamma_{k,a}) \quad (10)$$

The link capacity of the idle user terminal k is a minimum value of the cellular link capacity and the relay link capacity, as shown in Equation (11):

$$C_k=\min(C_{k,A}, C_{k,a}) \quad (11)$$

The above-described processing are performed on each idle user terminal in the third region $\Delta_i$, so as to find the idle user terminal of the maximum link capacity in the third region $\Delta_i$ and use it as the relay user terminal, as shown in Equation (12):

$$\{k_{max}\} = \max_k(C_k) \quad (12)$$

If $\Delta_i$ is a null set, or it is impossible to select a suitable relay user in $\Delta_i$, then the relay user terminal is selected in $\Delta_{i+1}$ region.

Step 309: establishing the relay communication connection with the destination user through the relay user terminal.

The communication connection can be established by steps of: allocating, by the base station, frequency and time slot to the destination user terminal and the relay user terminal, and notifying the destination user terminal and the corresponding relay user terminal of an allocation result through a downlink control channel; and the base station communicating with the relay user terminal by using the frequency and time slot allocated, and the relay user terminal communicating with the destination user terminal by using the frequency and time slot allocated, so as to implement the relay communication between the base station and the destination user terminal.

Embodiment Three

Figure 5A:
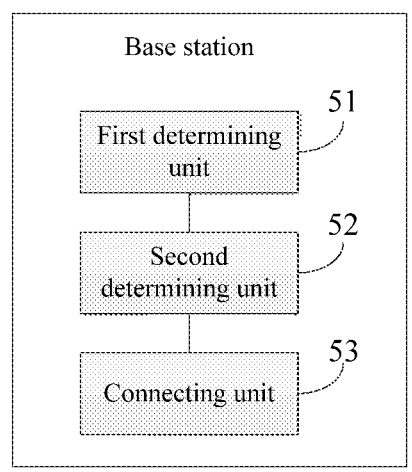
FIG. 5a~FIG. 5e are structural schematic diagram of a base station according to an embodiment of the present disclosure.

This embodiment discloses a base station. As shown in FIG. 5a, the base station comprises a first determining unit 51, a second determining unit 52 and a connecting unit 53.

The first determining unit 51 determines N first regions based on N first thresholds. The first threshold represents reliability of a first communication connection. The first communication connection is a communication connection between the base station and a user terminal within a cell of the base station. N is an integer greater than or equal to 1.

The second determining unit 52 determines T third regions based on the N first regions and M second regions. M and T are integers greater than or equal to 1, the M second regions is determined based on M second thresholds. The second threshold represents reliability of a second communication connection. The second communication connection is a communication connection between a destination user terminal and a user terminal other than the destination user terminal within the cell of the base station.

The connecting unit 53 selects a relay user terminal from among the user terminals within the third regions, to establish a communication connection with the destination user terminal through the relay user terminal.

Figure 5B:
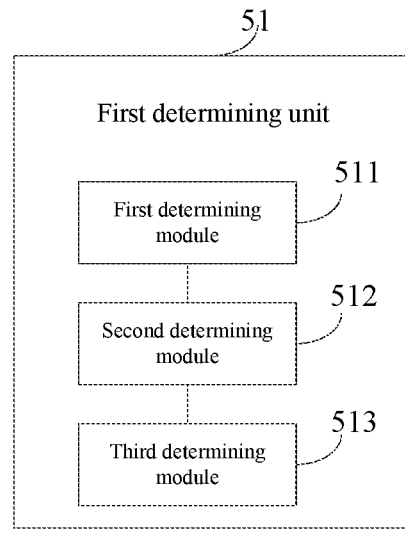

As shown in FIG. 5b, the first determining unit 51 includes a first determining module 511, a second determining module 512, and a third determining module 513.

The first determining module 511 determines receiving signal-to-noise ratio thresholds corresponding to the N first thresholds based on the reliability of the first communication connection;

The second determining module 512 determines N first distances based on the receiving signal-to-noise ratios of the user terminal and the N receiving signal-to-noise ratio thresholds. The first distance is a distance between the base station and the user terminal within the cell of the base station;

The third determining module 513 determines the N first regions within the cell of the base station reference to the position of the base station, based on the N first distances determined.

Figure 5C:
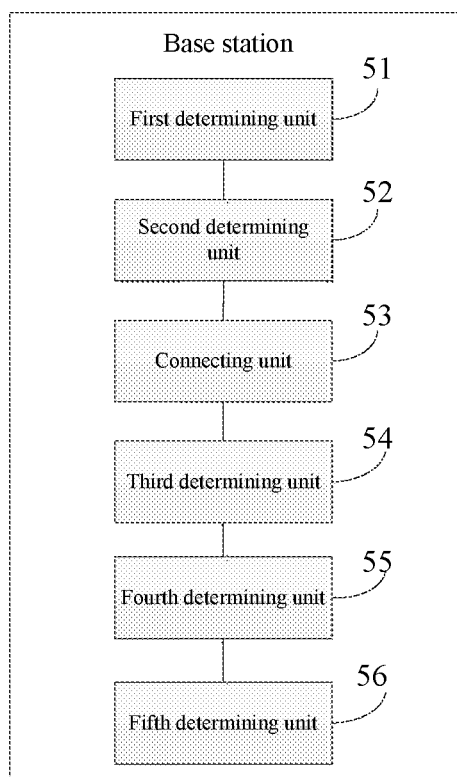

As shown in FIG. 5c, based on FIG. 5a, the base station further includes a third determining unit 54, a fourth determining unit 55, and a fifth determining unit 56.

The third determining unit 54 determines receiving signal-to-noise ratio thresholds corresponding to the M second thresholds, based on the reliability of the second communication connection.

The fourth determining unit 55 determines second distances corresponding to the M receiving signal-to-noise ratio thresholds based on the M receiving signal-to-noise ratio thresholds;

The fifth determining unit 56 determines the M second distances reference to the position of the user terminal, based on the M second distances determined.

Figure 5D:
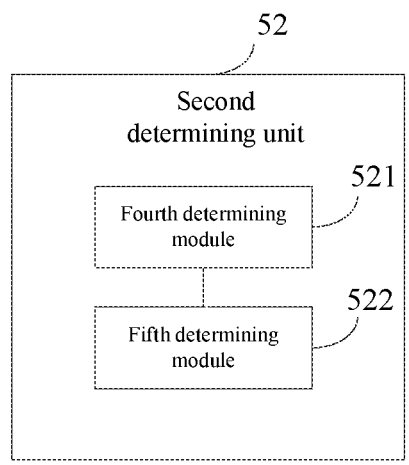

As shown in FIG. 5d, the second determining unit 52 includes a fourth determining module 521, and a fifth determining module 522.

The fourth determining module 521 identifies an overlapping region between any first region and any second region as the third region.

The fifth determining module 522 identifies priority of the third region based on the first threshold and the second threshold corresponding to the third region.

Figure 5E:
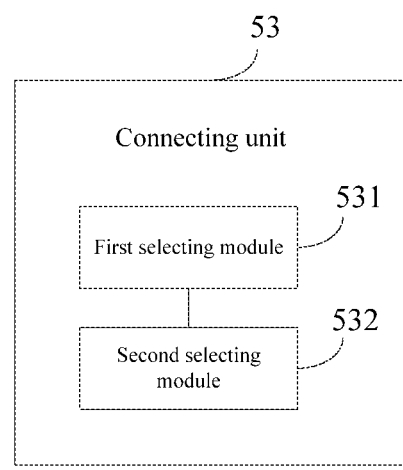

As shown in FIG. 5e, the connecting unit 53 includes a first selecting module 531, and a second selecting module 532.

The first selecting module 531 selects a target third region in a descending order of priority of the T third regions;

The second selecting module 532 selects a user terminal whose link capacity meets a preset condition from among user terminals within the target third region, as the relay user terminal.

In practical application, the first determining unit 51, the second determining unit 52, the third determining unit 54, the fourth determining unit 55 and the fifth determining unit 56 may be implemented by a processor or a logic programmable gate array (FPGA) in the base station; and the connecting unit 53 may be implemented by a transmitter and a receiver in the base station.

Those of ordinary skill in the art can understand that all or part of the steps of the method for implementing the above embodiments can be performed by program instruction-related hardware, and the corresponding program can be stored in a computer-readable storage medium. When executed, the program can execute the steps included in the embodiments of the above method. The storage medium may includes all kind of medium for storing program codes which are a removable storage device, a Read-Only Memory (ROM), a Random Access Memory (RAM), a magnetic disk or an optical disk etc.

Alternatively, if the above-described integrated units of the present disclosure are implemented by software function modules as sold or used as independent products, they can also be stored in a computer-readable storage medium. Based on such understanding, the technical solutions of the embodiments of present disclosure substantially, or their contents contributing to the prior art, may be embodied in the form of a software product. The software product can be stored in a storage medium, including instructions to enable a computer device (which may be a personal computer, a server or a network device) to execute part of all of the method according to the embodiments of the present disclosure. The above-described storage medium includes the removable storage device, ROM, RAM, the magnetic disk or the optical disk, which can store program codes.

The above are only specific embodiments of the present application, but the scope of the embodiment of the invention is not limited thereto. Those skilled in the art, within the technical scope disclosed by the embodiment of the invention, can easily think of variations or replacements, which should be covered within the protection scope of the embodiment of the invention. Therefore, the scope of the present disclosure should be the scope of the following claims.

The present application claims priority of Chinese Patent Application No. 201410638694.1 filed on Nov. 7, 2014, and the full texts thereof are incorporated by reference herein as part of the present application.

What is claimed is:

1. An information processing method applied to a base station, comprising:

determining N first regions based on N first thresholds, the N first thresholds representing reliability of a first communication connection, the first communication connection being a communication connection between the base station and a user terminal within a cell of the base station, N being an integer greater than or equal to 1, the N first regions comprising areas around the base station that the base station signal reaches;

determining T third regions based on the N first regions and M second regions, M and T being integers greater than or equal to 1, the M second regions being determined based on M second thresholds, the M second thresholds representing reliability of a second communication connection, the second communication connection being a communication connection between a destination user terminal and a user terminal other than the destination user terminal within the cell of the base station, the M second regions comprising areas around the destination user terminal that the destination user terminal reaches and the T third regions comprising areas where the N first regions and the M second regions overlap, the T third regions determined by:
  identifying an overlapping region between any first region and any second region as the third region; and
  identifying priority of the third region based on the first threshold for the first regions and the second threshold for the second region corresponding to the third region;

selecting a relay user terminal from among user terminals within the T third regions to establish a relay communication connection with the destination user terminal through the relay user terminal by:
  selecting a target third region in a descending order of priority of the T third regions; and
  selecting a user terminal whose link capacity meets a preset condition from among user terminals within the target third region as the relay user terminal.

2. The method according to claim 1, wherein, the determining N first regions based on N first thresholds comprises:

determining N receiving signal-to-noise ratio thresholds corresponding to the N first thresholds based on the reliability of the first communication connection;

determining N first distances based on the N receiving signal-to-noise ratio thresholds, wherein the first distance is a distance between the base station and the user terminal within the cell of the base station;

determining the N first regions within the cell of the base station reference to the position of the base station based on the N first distances determined.

3. The method according to claim 2, the method further comprises:

determining M receiving signal-to-noise ratio thresholds corresponding to the M second thresholds based on the reliability of the second communication connection;

determining M second distances corresponding to the M receiving signal-to-noise ratio thresholds based on the M receiving signal-to-noise ratio thresholds;

determining the M second regions reference to the position of the destination user terminal based on the M second distances determined.

4. The method according to claim 3, wherein, the determining T third regions based on the N first regions and M second regions comprises:

identifying an overlapping region between any first region and any second region as the third region;

identifying priority of the third region based on the first threshold and the second threshold corresponding to the third region.

5. The method according to claim 4, wherein, the selecting a relay user terminal from among user terminals within the third regions comprises:

selecting a target third region in a descending order of priority of the T third regions;

selecting a user terminal whose link capacity meets a preset condition from among user terminals within the target third region as the relay user terminal.

6. The method according to claim 2, wherein, the determining T third regions based on the N first regions and M second regions comprises:

identifying an overlapping region between any first region and any second region as the third region;

identifying priority of the third region based on the first threshold and the second threshold corresponding to the third region.

7. The method according to claim 6, wherein, the selecting a relay user terminal from among user terminals within the third regions comprises:

selecting a target third region in a descending order of priority of the T third regions;

selecting a user terminal whose link capacity meets a preset condition from among user terminals within the target third region as the relay user terminal.

8. A base station, comprising:

a first determining unit, for determining N first regions based on N first thresholds, the N first thresholds representing reliability of a first communication connection, the first communication connection being a communication connection between the base station and a user terminal within a cell of the base station, N being an integer greater than or equal to 1, the N first regions comprising areas around the base station that the base station signal reaches;

a second determining unit, for determining T third regions based on the N first regions and M second regions, M and T being integers greater than or equal to 1, the M second regions being determined based on M second thresholds, the M second thresholds representing reliability of a second communication connection, the second communication connection being a communication connection between a destination user terminal and a user terminal other than the destination user terminal within the cell of the base station, the M second regions comprising areas around the destination user terminal that the destination user terminal reaches and the T third regions comprising areas where the N first regions and the M second regions overlap, the T third regions determined by:

identifying an overlapping region between any first region and any second region as the third region; and identifying priority of the third region based on the first threshold for the first regions and the second threshold for the second region corresponding to the third region;

a connecting unit, for selecting a relay user terminal from among user terminals within the T third regions to establish a relay communication connection with the destination user terminal through the relay user terminal by:

selecting a target third region in a descending order of priority of the T third regions; and selecting a user terminal whose link capacity meets a preset condition from among user terminals within the target third region as the relay user terminal.

9. The base station according to claim 8, wherein, the first determining unit comprises:

a first determining module, for determining N receiving signal-to-noise ratio thresholds corresponding to the N first thresholds based on the reliability of the first communication connection;

a second determining module, for determining N first distances based on the N receiving signal-to-noise ratio thresholds, wherein the first distance is a distance between the base station and the user terminal within the cell of the base station;

a third determining module, for determining the N first regions within the cell of the base station reference to the position of the base station, based on the N first distances determined.

10. The base station according to claim 9, wherein, the base station further comprises:

a third determining unit, for determining M receiving signal-to-noise ratio thresholds corresponding to the M second thresholds based on the reliability of the second communication connection;

a fourth determining unit, for determining M second distances corresponding to the M receiving signal-to-noise ratio thresholds, based on the M receiving signal-to-noise ratio thresholds;

a fifth determining unit, for determining the M second regions reference to the position of the user terminal based on the M second distances determined.

11. The base station according to claim 10, wherein, the second determining unit comprises:

a fourth determining module, for identifying an overlapping region between any first region and any second region as the third region;

a fifth determining module, for identifying priority of the third region based on the first threshold and the second threshold corresponding to the third region.

12. The base station according to claim 11, wherein, the connecting unit includes:

a first selecting module, for selecting a target third region in a descending order of priority of the T third regions;

a second selecting module, for selecting a user terminal whose link capacity meets a preset condition from among user terminals within the target third region, as the relay user terminal.

13. The base station according to claim 9, wherein, the second determining unit comprises:

a fourth determining module, for identifying an overlapping region between any first region and any second region as the third region;

a fifth determining module, for identifying priority of the third region based on the first threshold and the second threshold corresponding to the third region.

14. The base station according to claim 13, wherein, the connecting unit includes:

a first selecting module, for selecting a target third region in a descending order of priority of the T third regions;

a second selecting module, for selecting a user terminal whose link capacity meets a preset condition from among user terminals within the target third region, as the relay user terminal.

15. A base station, comprising:

a first determining unit, for determining N first regions based on N first thresholds, the N first thresholds representing reliability of a first communication connection, the first communication connection being a communication connection between the base station and a user terminal within a cell of the base station, N being an integer greater than or equal to 1, the N first regions comprising areas around the base station that the base station signal reaches;

a second determining unit, for determining T third regions based on the N first regions and M second regions, M and T being integers greater than or equal to 1, the M second regions being determined based on M second thresholds, the M second thresholds representing reliability of a second communication connection, the second communication connection being a communication connection between a destination user terminal and a user terminal other than the destination user terminal within the cell of the base station, the M second regions comprising areas around the destination user terminal that the destination user terminal reaches and the T third regions comprising areas where the N first regions and the M second regions overlap, the T third regions determined by:

identifying an overlapping region between any first region and any second region as the third region; and identifying priority of the third region based on the first threshold for the first regions and the second threshold for the second region corresponding to the third region;

a connecting unit, for selecting a relay user terminal from among user terminals within the T third regions to establish a relay communication connection with the destination user terminal through the relay user terminal by:

selecting a target third region in a descending order of priority of the T third regions; and selecting a user terminal whose link capacity meets a preset condition from among user terminals within the target third region as the relay user terminal;

a first determining module, for determining N receiving signal-to-noise ratio thresholds corresponding to the N first thresholds based on the reliability of the first communication connection;

a second determining module, for determining N first distances based on the N receiving signal-to-noise ratio thresholds, wherein the first distance is a distance between the base station and the user terminal within the cell of the base station; and a third determining module, for determining the N first regions within the cell of the base station reference to the position of the base station, based on the N first distances determined.

16. The base station according to claim 15, wherein, the base station further comprises:

a third determining unit, for determining M receiving signal-to-noise ratio thresholds corresponding to the M second thresholds based on the reliability of the second communication connection;

a fourth determining unit, for determining M second distances corresponding to the M receiving signal-to-noise ratio thresholds, based on the M receiving signal-to-noise ratio thresholds;

a fifth determining unit, for determining the M second regions reference to the position of the user terminal based on the M second distances determined.

* * * * *